United States Patent
Jia

(10) Patent No.: US 9,802,284 B2
(45) Date of Patent: Oct. 31, 2017

(54) CLAMPING DEVICE

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventor: Jian-Hua Jia, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 211 days.

(21) Appl. No.: 14/688,417

(22) Filed: Apr. 16, 2015

(65) Prior Publication Data

US 2016/0114447 A1    Apr. 28, 2016

(30) Foreign Application Priority Data

Oct. 23, 2014    (CN) .......................... 2014 1 0570108

(51) Int. Cl.
*B23Q 7/00*    (2006.01)
*B23Q 3/06*    (2006.01)
*B23Q 3/08*    (2006.01)

(52) U.S. Cl.
CPC ............. *B23Q 7/006* (2013.01); *B23Q 3/082* (2013.01)

(58) Field of Classification Search
CPC ................................ B23Q 3/082; B23Q 7/006
See application file for complete search history.

(56) References Cited

U.S. PATENT DOCUMENTS

| 5,031,490 A * | 7/1991 | Grossmann | B23Q 7/045 29/36 |
| 5,572,915 A * | 11/1996 | Bertini | B23B 13/123 292/115 |
| 8,042,626 B2 * | 10/2011 | Slack | E21B 19/06 166/77.53 |
| 9,186,738 B2 * | 11/2015 | Mall | B23F 23/04 |
| 2004/0040424 A1 * | 3/2004 | Smith | B23B 31/4033 82/124 |

(Continued)

FOREIGN PATENT DOCUMENTS

JP    2010099820 A  *  5/2010

*Primary Examiner* — Sara Addisu
(74) *Attorney, Agent, or Firm* — Steven Reiss

(57) ABSTRACT

A clamping device configured to automatically pull and clamp workpieces includes a clamping module and a driving module. The clamping module includes a sliding block, two clamping members positioned at two sides of the sliding block, and a connecting plate connected to one end of the sliding block. The driving module includes a driving member. The sliding block defines at least one pair of guiding grooves, and a distance between the paired guiding grooves is increased in a direction toward the connecting plate. The two clamping members are mounted on the guiding grooves of the sliding block in a sliding way. The connecting plate is fixedly connected to the driving member. When the connecting plate and the sliding plate are driven by the driving member, the two clamping members move toward or away from each other to clamp or release the workpiece.

11 Claims, 5 Drawing Sheets

(56) References Cited

U.S. PATENT DOCUMENTS

| | | | |
|---|---|---|---|
| 2004/0129531 A1* | 7/2004 | Nagai | A24C 5/327 198/370.12 |
| 2006/0060039 A1* | 3/2006 | Joo | B23B 31/003 82/124 |
| 2011/0177925 A1* | 7/2011 | Mayr | B23Q 1/4876 483/44 |
| 2015/0082952 A1* | 3/2015 | Wu | B23B 31/16258 82/46 |

* cited by examiner

CLAMPING DEVICE

FIELD

The subject matter herein generally relates to a clamping device for automatically pulling and clamping workpieces in lathe.

BACKGROUND

Numerical control lathes are commonly used in machining processes. The numerical control lathe can process workpieces using cutting tools controlled by predetermined procedures. When the procedures finished, the workpiece needs to be pulled and transferred to the next station. The workpiece can be pulled manually, but this method may waste manpower and time.

BRIEF DESCRIPTION OF THE DRAWINGS

Implementations of the present technology will now be described, by way of example only, with reference to the attached figures.

DETAILED DESCRIPTION

Figure 1:
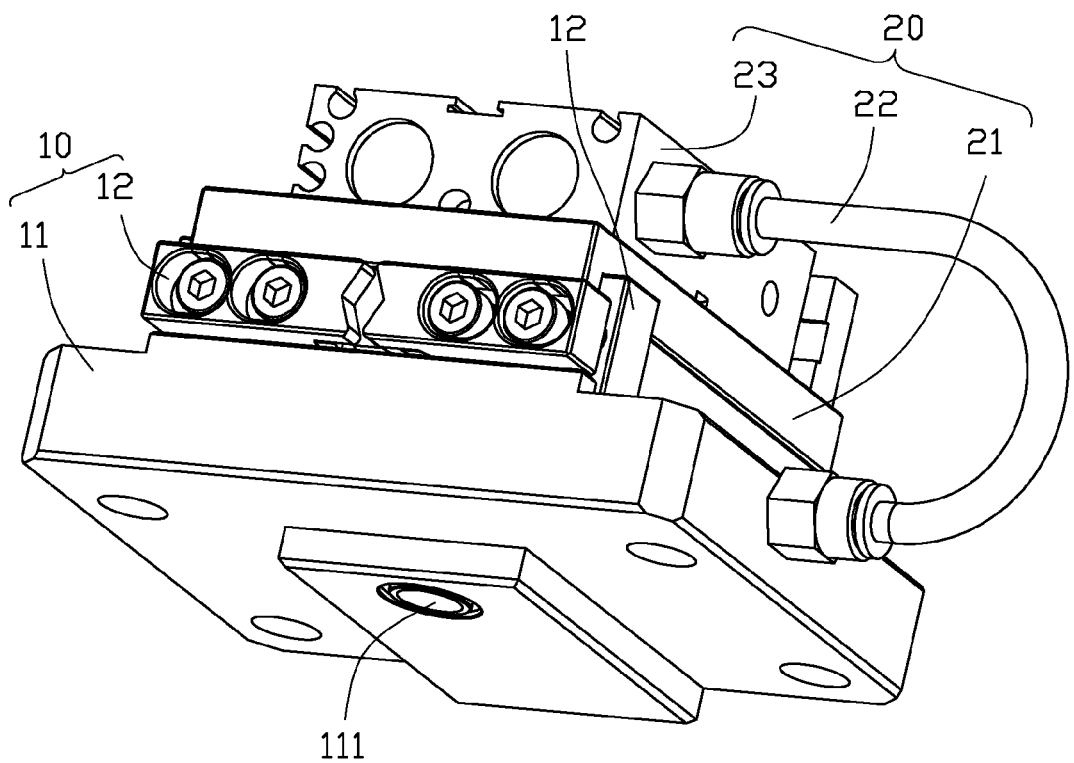
FIG. 1 is an isometric view of one embodiment of a clamping device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented. The term "comprising" when utilized, means "including, but not necessarily limited to"; it specifically indicates open-ended inclusion or membership in the so-described combination, group, series and the like.

The present disclosure is described in relation to a clamping device used to automatically pull and clamp workpieces. The clamping device can be mounted on a lathe.

FIG. 1 illustrates a clamping device 100 can include a clamping module 10 and a driving module 20. The clamping module 10 can include a base plate 11 and two clamping members 12. The base plate 11 can be mounted on a lathe (not shown) and can be substantially rectangular. The base plate 11 can define an opening 111 for guiding cutting fluid of the lathe. In at least one embodiment, the opening 111 can be defined on a surface of the base plate 11 away from the driving module 20. In other embodiments, the opening 111 can be defined on other surfaces of the base plate 11, as long as the cutting fluid of the lathe can be introduced into the base plate 11 from the opening 111. The two clamping members 12 can be positioned at two opposite sides of the base plate 11 and can move toward or away from each other to clamp or release the workpiece.

The driving module 20 can be mounted on top of the clamping module 10 and include a supporting plate 21, a connecting pipe 22, and a driving member, in this embodiment, the driving member can be a hydraulic cylinder 23. The supporting plate 21 can be mounted above the clamping module 10 and can be substantially rectangular. One end of the connecting pipe 22 can be connected to the base plate 11, and the other end of the connecting pipe 22 can be connected to the hydraulic cylinder 23, thus the connecting pipe 22 can be configured to delivery the cutting fluid. The hydraulic cylinder 23 can be mounted on top of the supporting plate 21.

Figure 2:
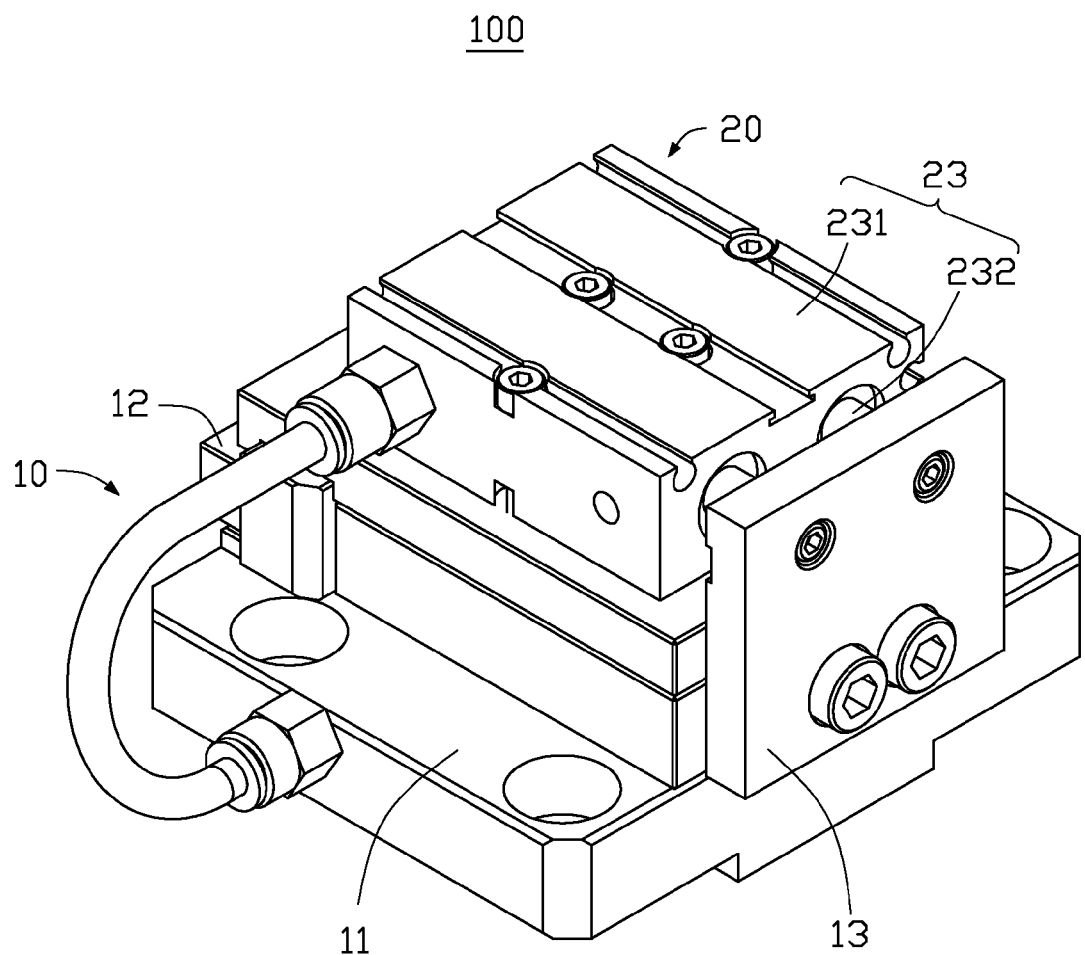
FIG. 2 is an isometric view of the clamping device, viewed from another angle.

FIG. 2 illustrates that the hydraulic cylinder 23 can include a cylinder body 231 and two parallel pulling rods 232. One end of the pulling rods 232 can be connected to an inner space of the cylinder body 231, and the other end of the pulling rods 232 can be protrude out of the cylinder body 231. The pulling rods 232 can move relative to the cylinder body 231.

The clamping module 10 can further include a connecting plate 13. The connecting plate 13 can be substantially rectangular and positioned at one side of the base plate 11 away from the clamping members 12. The connecting plate 13 can be substantially perpendicular to the base plate 11. The two pulling rods 232 can be fixed to the connecting plate 13. In at least one embodiment, the two pulling rods 232 can be fixed to the connecting plate 13 by screws (not shown).

Figure 3:
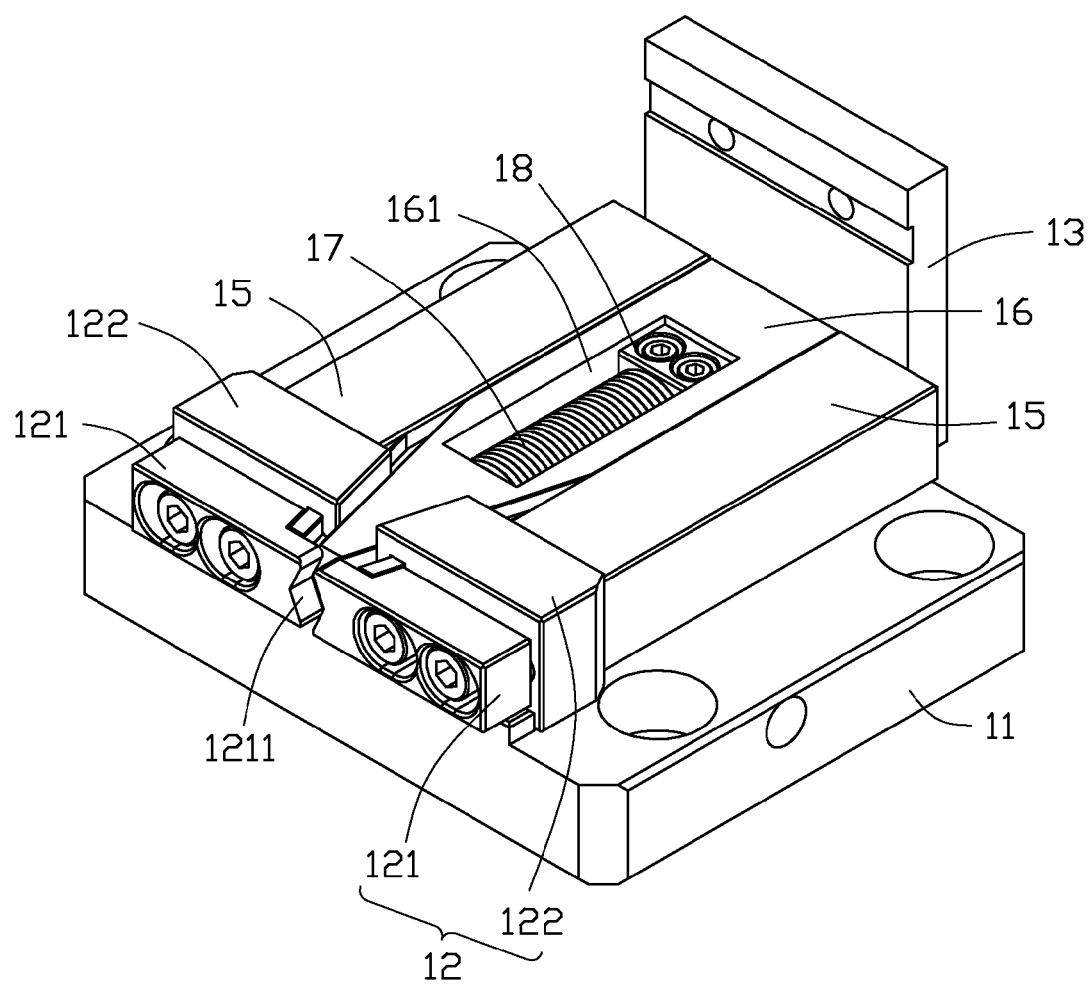
FIG. 3 is an isometric view of a clamping module of the clamping device in FIG. 1.

FIG. 3 illustrates that each clamping member 12 can include a clamping block 121 and a guiding block 122. The clamping module 10 can further include a pair of guide rails 15, a sliding block 16 positioned between the guide rails 15, an elastic member received in the sliding block 16, and a positioning block 18.

The two clamping blocks 121 can be positioned at an edge of the base plate 11 and at two opposite sides of the guiding block 122, and each clamping blocks 121 can include a V-shaped clamping portion 1211. The two clamping portions 1211 can face to each other. When the two clamping blocks 121 move toward each other, the workpiece can be clamped by the two clamping portions 1211. The guiding block 122 can be connected to the corresponding clamping block 121.

The two parallel guide rails 15 can be substantially rectangular and distanced from each other. The guide rails 15 can be fixed on the base plate 11, and two ends of the guide rail 15 can be in contact with the connecting plate 13 and the guiding block 122. The guide rails 15 can be configured to limit the movement of the guiding block 122 and the sliding block 16. The sliding block 16 can be interposed between the guide rails 15, and define a groove 161 in the central portion thereof. The positioning block 18 can be fixed at one end of the groove 161 near the connecting plate 13. One end of the elastic member 17 can be fixed at the positioning block 18, and the other end of elastic member 17 can elastically resist against to the other end of groove 161 near the guiding block 122.

Figure 4:
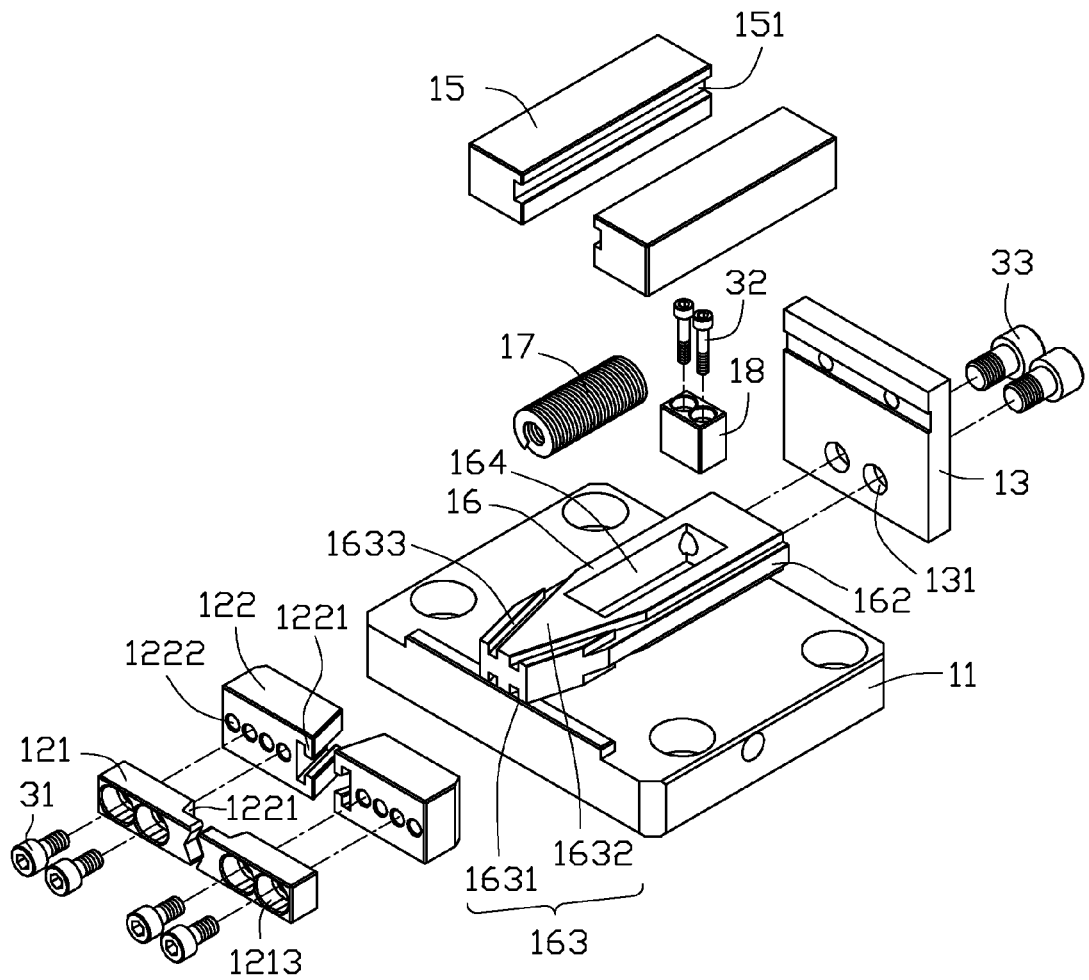
FIG. 4 is an exploded view of the clamping module in FIG. 3.

FIG. 4 illustrates that each guide rail 15 can define a sliding groove 151, and the sliding block 16 can include two protrusion parts 162 on two side surfaces toward the guide rails 15. The two protrusion parts 162 can be received in the sliding grooves 151, so the sliding block 16 can slide along the guide rails 15.

Referring to FIG. 3 and FIG. 4, the sliding block 16 can be substantially wedge shaped, and can include a trapezoid portion 163 near the guiding block 122 and a rectangular portion 164 near the connecting plate 13. The trapezoid portion 163 can include a first surface 1631 toward the base plate 11, and a second surface 1632 opposite to the first surface 1631. Each of the first surface 1631 and the second surface 1632 can define a pair of guiding grooves 1633. The guiding grooves 1633 can be substantially parallel to the edges of the trapezoid portion 163, and extend from an edge of the trapezoid portion 163 to the rectangular portion 164. The guiding grooves 1633 can be inclined to the guiding block 122 and side edges of the base plate 11. A distance formed between the two paired guiding grooves 1633 can be increased in a direction toward the connecting plate 13. The groove 161 can be defined in the central portion of the rectangular portion 164. The protrusion parts 162 can be arranged at side edges of the rectangular portion, and can extend to the trapezoid portion 163.

The clamping block 121 can define a concave portion 1212 on a surface toward the sliding block 16. The concave portion 1212 can match to the end portion of the trapezoid portion 163, thus the clamping block 121 can be tightly in contact with the sliding block 16. The clamping block 121 can define at least one first threaded hole 1213. In at least one embodiment, the first threaded hole 1213 can be two.

The two guiding blocks 122 can be arranged at two sides of the trapezoid portion 163, and each guiding block 122 can further include two opposing clasps 1211 at an end portion. The two clasps 1211 can be clasped in the guiding grooves 1633, and can slide in the guiding grooves 1633, thus the clamping members 12 can be mounted on the sliding block 16 in a sliding way. That is, the clamping members 12 can be slidably mounted on a respective one of the paired guiding grooves 1633. When the sliding block 16 moves, the clasps 1221 can slide in the guiding groove 1633, and the distance between the two guiding blocks 122 can be changed. The two guiding blocks 122 can move toward or away from each other, and the clamping blocks 121 connected to the guiding blocks 122 can move with the guiding blocks 122. Each guiding block 122 can define a plurality of second threaded holes 1222. In at least one embodiment, the second threaded holes 1222 can be four.

The clamping device can further include a plurality of first fastening members 31. Each first fastening member 31 can be fixed in one of the first threaded hole 1213 and one of the second threaded hole 1222, thus the clamping block 121 can be fixedly connected to the guiding block 122. As the second threaded holes 1222 are more than the first threaded hole 1213, the first fastening member 31 can be selectively fastened to one first threaded hole 1213 and one second threaded hole 1222. Therefore, the distance between the two clamping blocks 121 can be adjusted for matching to different workpieces.

The positioning block 18 can be fixed at the base plate 11 by at least one second fastening member 32. The positioning block 18 can be fixed in the groove 161 of the sliding block 16 for fixing the elastic member 17. The sliding block 16 can be fixed to the connecting plate 13 by at least one third fastening member 33.

Figure 5:
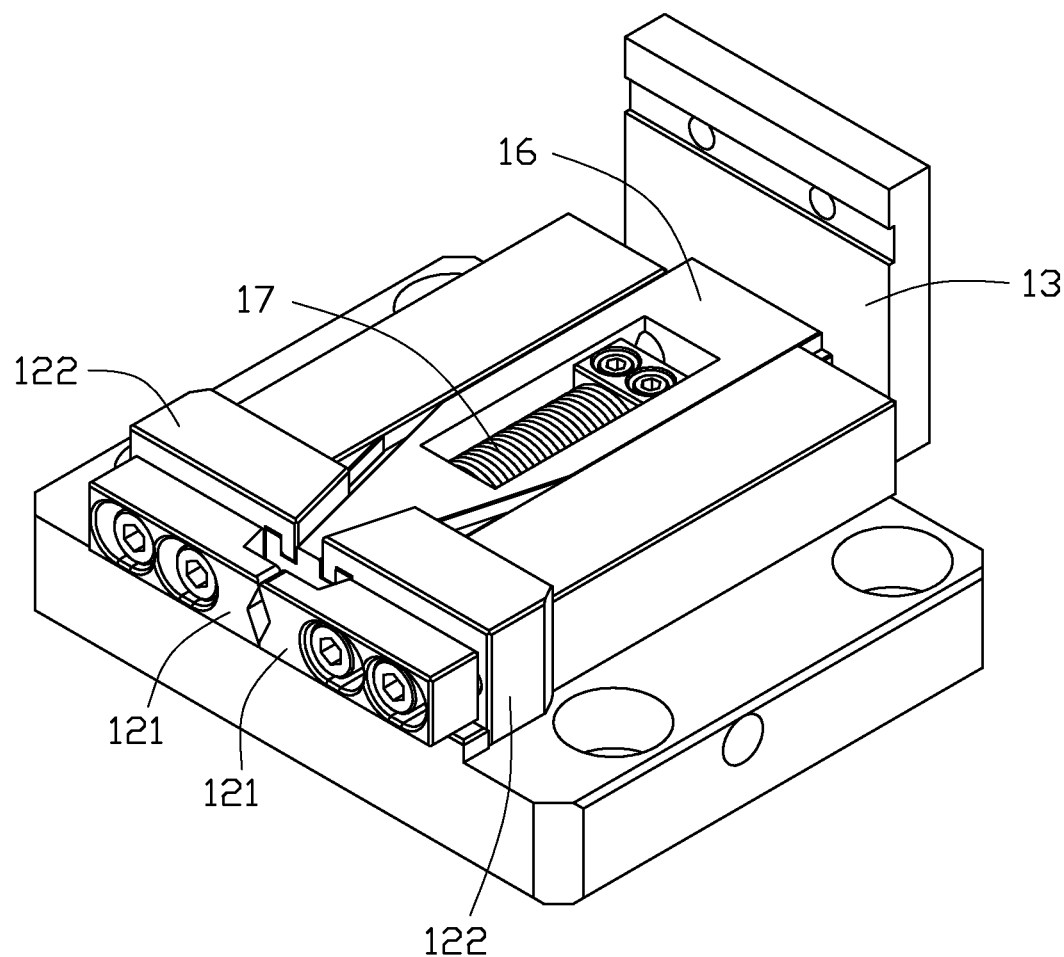
FIG. 5 is an isometric view of the clamping module in FIG. 3, viewed from another angle.

FIG. 5 illustrates that the connecting plate 13 can move away from the clamping blocks 121, and the sliding block 16 can move along with the connecting plate 13. At this time, the elastic member 17 can be compressed, and the guiding blocks 122 can slide in the sliding block 16.

In assembly, the sliding block 16 can be positioned at the base plate 11, and the two guide rails 15 can be fixed at two sides of the sliding block 16. The positioning block 18 and the elastic member 17 can be fixed in the groove 161. Then, the clasps 1221 of the two guiding blocks 122 can be clasped in the guiding grooves 1633 of the sliding block 16, and the two clamping blocks 121 can be mounted at the end portion of the trapezoid portion 163 and connected to the guiding blocks 122. At this time, the concave portions 122 are positioned at the end portion of the sliding block 16. After that, the connecting plate 13 can be fixedly connected to the sliding block 16, and the clamping module 10 can thus by assembled. The supporting plate 21 can be positioned on top of the clamping module 10, and the hydraulic cylinder 23 can be mounted at the supporting plate 21. The connecting pipe 22 can be connected between the hydraulic cylinder 23 and the base plate 11, and the connecting plate 13 can be fixedly connected to the pulling rods 232, thus the driving module 20 can be assembled. In other embodiments, the clamping device 100 can be assembled in other manner.

In operation, a first control procedure can be started by the lathe, and the cutting fluid can be guided into the base plate 11 through the opening 111, then delivered to the hydraulic cylinder 23 via the connecting pipe 22. The hydraulic cylinder 23 can drive the pulling rods 23 to move away from the base plate 11, and the connecting plate 13 and the sliding block 16 can move along with the pulling rods 232. The elastic member 17 can be compressed. The clasps 1221 of the two guiding blocks 122 can slide in the guiding grooves 1633 when the sliding block 16 moves, so the two guiding blocks 122 can move toward each other, the two clamping blocks 121 can also move toward each other to clamp the workpiece.

After that, a second control procedure can be started, and the cutting fluid is no longer supplied. The pulling rods 232 are not driven by the hydraulic cylinder 23, so the elastic member 17 can restore elastic deformation. The sliding block 16 can move toward the clamping blocks 121 driven by the elastic member 17. At the same time, the two guiding blocks 122 and the two clamping blocks 121 can move away from each other to release the workpiece. Therefore, the clamping device 100 can automatically pull the workpiece.

In other embodiments, the hydraulic cylinder 23 can be replaced by other driving members, such as an air cylinder. The opening 111 can be configured to supply gas.

In other embodiments, the two guiding blocks 122 can be omitted, and the clasps can be arranged at the two clamping blocks 121.

In other embodiments, the elastic member 17 and the positioning block 18 can be omitted, as long as the hydraulic cylinder 23 can drive the pulling rods 232 back to an initial position.

In other embodiments, the guiding grooves 1633 on the first surface 1631 of the sliding block 16 can be omitted.

The clamping device 100 of this disclosure includes the clamping module 10 and the driving module 20. The driving module 20 can drive the pulling rods 232, and the pulling rods 232 can drive the connecting plate 13 and the sliding block 16. When the sliding block 16 moves, the guiding block 122 and the clamping blocks 121 can move toward each other to clamp the workpiece. The elastic member 17 can drive the sliding block 16 to move back to the initial position, thus the guiding blocks 122 and the clamping blocks 121 can move away from each other to release the workpiece. Therefore, the clamping device 100 can automatically pull the workpieces.

The embodiments shown and described above are only examples. Many details are often found in the art such as the other features of a clamping device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A clamping device configured to automatically pull at least one workpiece, the clamping device comprising:
   a clamping module comprising:
      a sliding block defining at least one pair of guiding grooves;
      two clamping members positioned at two opposite sides of the sliding block; and
      a connecting plate connected to one end of the sliding block;
   a driving module comprising a driving member fixedly connected to the connecting plate; and
   a distance formed between the paired guiding grooves is increased in a direction toward the connecting plate;
   wherein the two clamping members are slidably mounted on a respective one of the paired guiding grooves; and
   when the connecting plate and the sliding plate being driven to move by the driving member, the two clamping members move toward or away from each other to clamp or release the workpiece,
   wherein the clamping module further comprises a base plate and a pair of guide rails mounted on the base plate, and the sliding block is positioned between the pair of guide rails and is configured to slide along the pair of guide rails, and the two clamping members are in contact with the pair of guide rails.

2. The clamping device of claim 1,
   wherein the connecting plate are substantially perpendicular to the base plate.

3. The clamping device of claim 2, wherein the base plate defines an opening configured to supply cutting fluid or gas to the driving module; and the driving module further comprises a connecting pipe connected between the base plate and the driving member.

4. The clamping device of claim 1, wherein the each clamping member defines at least one clasp at an end portion toward the sliding block, and the at least one clasp is clasped in the guiding rails.

5. The clamping device of claim 4,
   wherein each clamping member comprises a clamping block and a guiding block fixed to the clamping block; and
   wherein the clamping block comprises a V-shaped clamping portion, and the clasp is arranged at the end portion of the guiding block toward the sliding block.

6. The clamping device of claim 5, wherein the clamping block defines at least one first threaded hole, and the guiding block defines a plurality of second threaded holes; the second threaded holes are more than the first threaded holes.

7. The clamping device of claim 1, wherein the sliding block comprises a first surface toward the base plate and a second surface opposite the first surface; and the guiding grooves are two and formed on the first surface and the second surface.

8. The clamping device of claim 7, wherein the sliding block comprises a trapezoid portion near the clamping members and a rectangular portion near the connecting plate, and the guiding grooves extend from the trapezoid portion to the rectangular portion.

9. The clamping device of claim 1,
   wherein the sliding block defines a groove, the clamping module further comprises an elastic member and a positioning block positioned in the groove;
   wherein one end of the elastic member is mounted on the positioning block, and the other end of the elastic member resists against the groove.

10. The clamping device of claim 1, wherein the driving member is a hydraulic cylinder or an air cylinder, and the driving member comprises at least one pulling rod fixedly connected to the connecting plate.

11. The clamping device of claim 1, wherein the driving module further comprises a supporting plate mounted on top of the clamping module, and the driving member is mounted on the supporting plate.

* * * * *